United States Patent
Stoeferle

(10) Patent No.: US 8,682,128 B2
(45) Date of Patent: Mar. 25, 2014

(54) OPTICAL WAVEGUIDE WITH PERIODIC SUB-WAVELENGTH SIZED REGIONS

(75) Inventor: Thilo H. C. Stoeferle, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/195,565

(22) Filed: Aug. 21, 2008

(65) Prior Publication Data

US 2010/0046901 A1    Feb. 25, 2010

(51) Int. Cl.
   *G02B 6/10*    (2006.01)
(52) U.S. Cl.
   USPC .......................... 385/129; 385/125; 385/132
(58) Field of Classification Search
   USPC .......................................... 385/125, 129–132
   See application file for complete search history.

(56) References Cited

U.S. PATENT DOCUMENTS

| | | | |
|---|---|---|---|
| 4,095,869 A | | 6/1978 | Reichelt et al. |
| 5,172,267 A | | 12/1992 | Yablonovitch |
| 5,526,449 A | * | 6/1996 | Meade et al. ............ 385/14 |
| 6,035,089 A | | 3/2000 | Grann et al. |
| 6,542,682 B2 | * | 4/2003 | Cotteverte et al. ........... 385/125 |
| 6,560,006 B2 | * | 5/2003 | Sigalas et al. ................ 359/321 |
| 6,757,463 B2 | | 6/2004 | Hutchinson et al. |
| 6,853,669 B2 | | 2/2005 | Simpson et al. |
| 7,099,549 B2 | | 8/2006 | Scheuer et al. |
| 7,315,663 B2 | * | 1/2008 | Wu .................................. 385/9 |
| 7,369,734 B2 | * | 5/2008 | Sakai et al. .................... 385/129 |
| 2002/0118941 A1 | * | 8/2002 | Notomi et al. ................ 385/129 |
| 2003/0123827 A1 | * | 7/2003 | Salerno et al. ................ 385/129 |
| 2004/0013384 A1 | * | 1/2004 | Parker et al. .................. 385/129 |
| 2004/0067035 A1 | * | 4/2004 | Parker et al. .................. 385/129 |
| 2004/0146257 A1 | * | 7/2004 | Parker et al. .................. 385/123 |

OTHER PUBLICATIONS

R. Magnusson et al., New Principle for Optical Filters, Department of Electrical Engineering, The University of Texas at Arlington, Arlington, Texas, 76019; Appl. Phys. Lett. 61 (9), Aug. 31, 1992, pp. 1022-1024.

Christopher P. Ausschnitt et al., Modeling for Profile-Based Process-Window Metrology, Data Analysis and Modeling for Process Control, edited by Kenneth W. Tobin, Jr., Proceedings of the SPIE, vol. 5378, pp. 38-47, (2004).

Carlos F.R. Mateus et al., Ultrabroadband Mirror Using Low-Index Cladded Subwavelength Grating, IEEE Photonics Technology Letters, vol. 16, No. 2, pp. 518-520, Feb. 2004.

* cited by examiner

*Primary Examiner* — Hemang Sanghavi
(74) *Attorney, Agent, or Firm* — Cantor Colburn LLP; Daniel Morris

(57) ABSTRACT

A guiding element suitable for integrated optics and transmission in the visible wavelength region includes a plurality of sub-wavelength sized regions in two parallel periodic arrangements embedded within a waveguide layer located on a planar substrate. The dielectric constant of each regions may be the same but different from that of the substrate, the waveguide layer, and the cladding. The periodicity, dimensions and shape of the regions of the periodic arrangement are selected to achieve the desired transmission and guiding of the incident radiation spectrum (e.g., parallel to the two periodic arrangements). A transparent layer with a dielectric constant between the dielectric constant of the periodic arrangement and the dielectric constant of the substrate/cladding provides confinement normal to the substrate.

18 Claims, 5 Drawing Sheets

Cladding $\varepsilon_3$
Waveguide $\varepsilon_2$
Substrate $\varepsilon_1$

Periodic structure $\varepsilon_4$

Optical mode

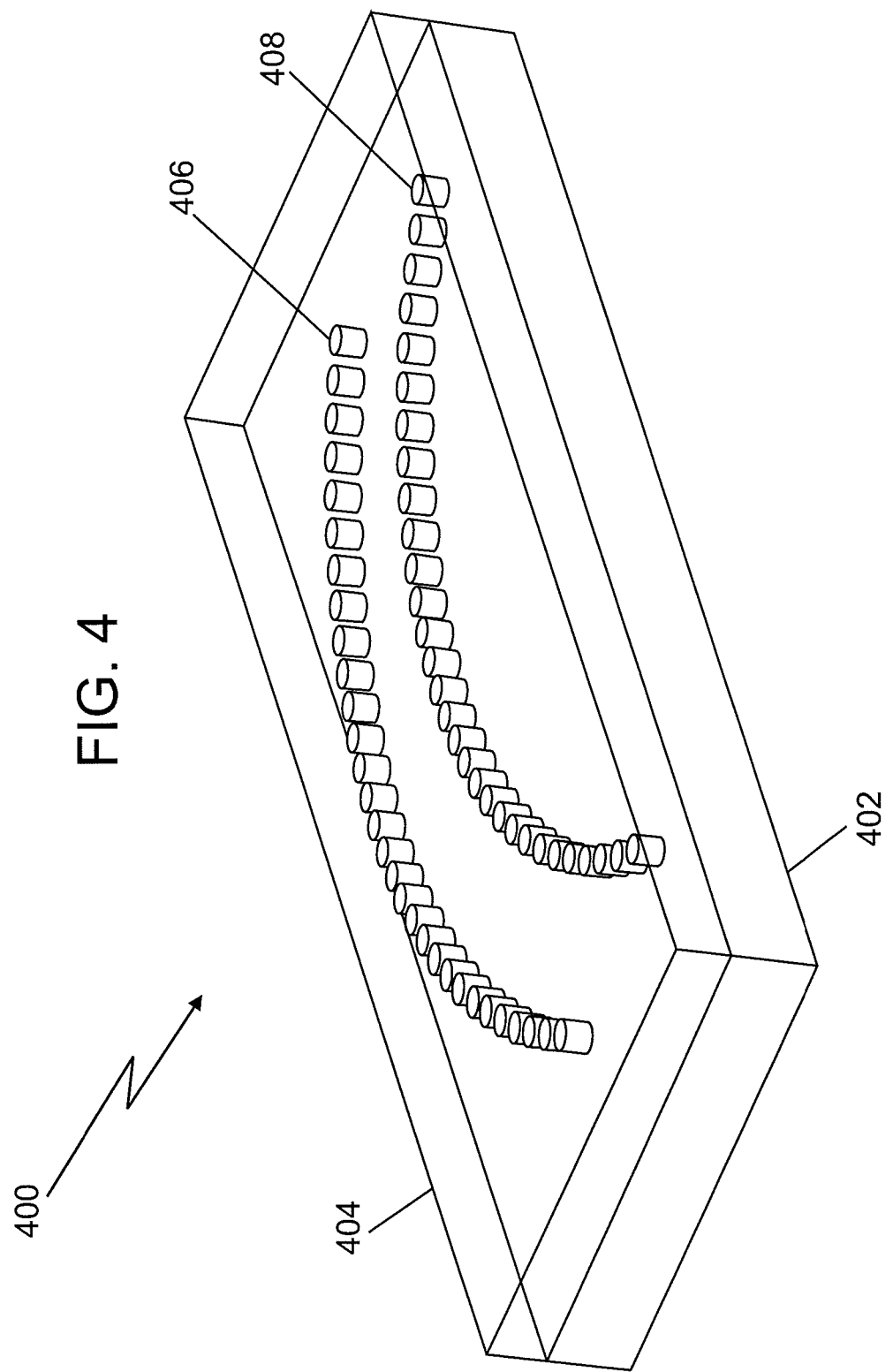

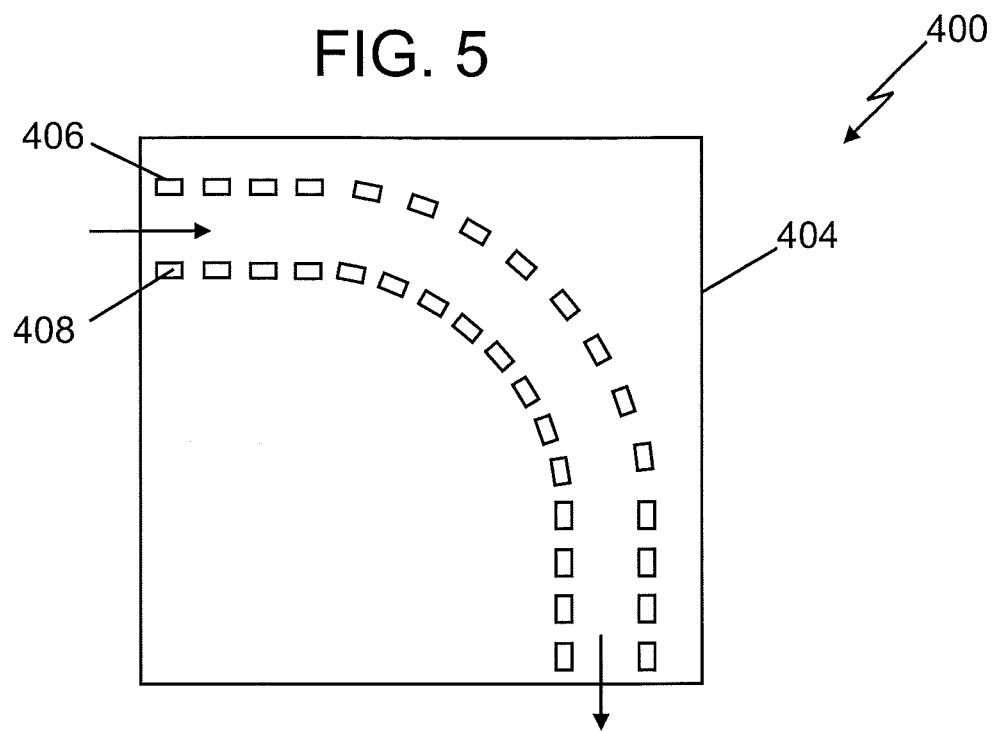
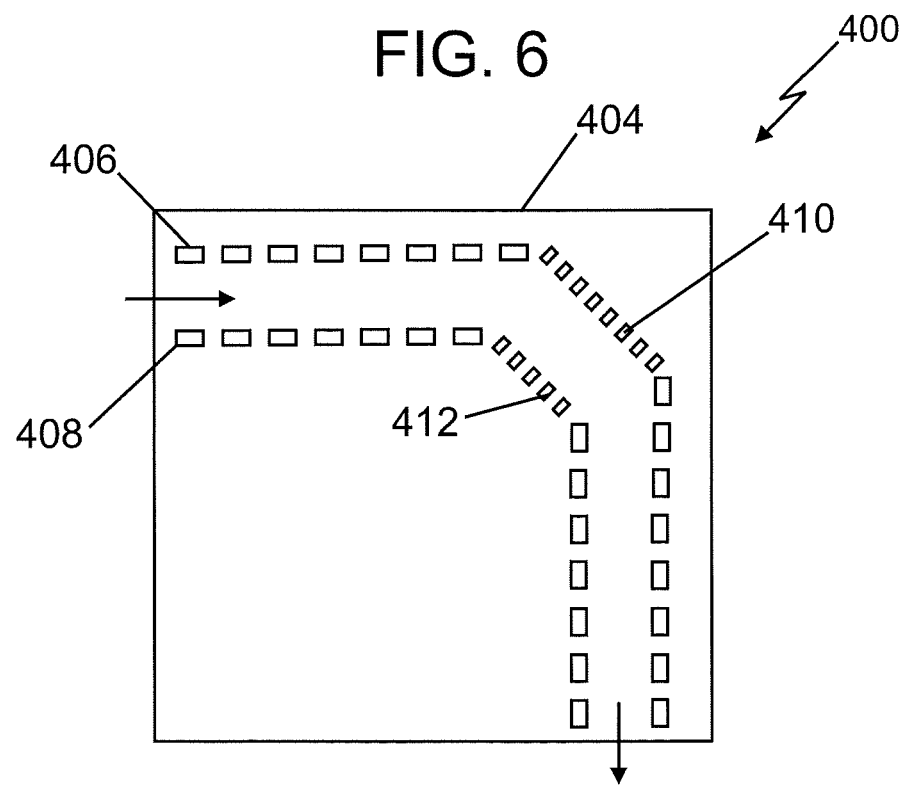

OPTICAL WAVEGUIDE WITH PERIODIC SUB-WAVELENGTH SIZED REGIONS

BACKGROUND

The present invention relates to optical elements, and, more specifically, to an optical waveguide having a plurality of periodic sub-wavelength sized regions or gratings in which the light propagates substantially parallel to the regions or gratings.

Guiding elements for electromagnetic radiation on planar substrates have typically been provided by one of two methods. One is by confining the light within a material having a relatively high dielectric constant ("core"), which is surrounded by a material having a lower dielectric constant ("cladding"). Another is by photonic crystals in which a two-dimensional periodic arrangement of materials with high and low dielectric constants creates a photonic bandgap that surrounds a defect line ("waveguide"). Confinement normal to the substrate is either provided by a transparent layer with a dielectric constant between the dielectric constant of the photonic crystal and the dielectric constant of the substrate/cladding or guiding (equals the total internal reflection) in the material of the photonic crystal itself.

A problem with the light confining approach is that the core material must have a relatively low absorption in the wavelength range to be transmitted. Furthermore, a relatively high contrast of the dielectric constants between the core and the cladding is required for achieving a relatively high areal integration density of the waveguides. Hence, crystalline semiconductors such as Si, GaAs or InP are typical materials for the core. However, they are not suitable for the visible wavelength range because of their absorption characteristics.

A problem with the photonic crystals approach is that the light penetrates into the photonic crystal structure (e.g., a two-dimensional periodic hexagonal array of holes) and decays exponentially. Hence, the material for the photonic crystal must have relatively low absorption in the wavelength range to be transmitted. Because of the required relatively high contrast of the dielectric constants between the materials in the photonic crystal (i.e., holes vs. bulk), crystalline semiconductors such as Si, GaAs or InP are typically used. However, these semiconductor materials are in general not suitable for the visible wavelength range because of their absorption characteristics. Further, the photonic crystal structure extends considerably transverse to the guiding direction (4-5 lattice periods or more), which prevents the realization of relatively dense areal integration.

BRIEF SUMMARY

According to various embodiments of the invention, a guiding element suitable for integrated optics and transmission in the visible wavelength region includes a plurality of sub-wavelength sized regions in two parallel periodic arrangements embedded within a waveguide located on a planar substrate. The periodicity, dimensions and shape of the regions of the periodic arrangement are selected to achieve the desired transmission and guiding of the incident radiation spectrum (e.g., parallel to the two periodic arrangements). A transparent layer with a dielectric constant between the dielectric constant of the periodic arrangement and the dielectric constant of the substrate/cladding provides confinement normal to the substrate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIG. 2, including

FIG. 3, including

FIG. 4 is a perspective view of a waveguide in accordance with another embodiment of the invention;

FIG. 5 is a top view of the waveguide of FIG. 4; and

FIG. 6 is a top view of an alternative embodiment of the waveguide of FIG. 4.

DETAILED DESCRIPTION

Figure 1:
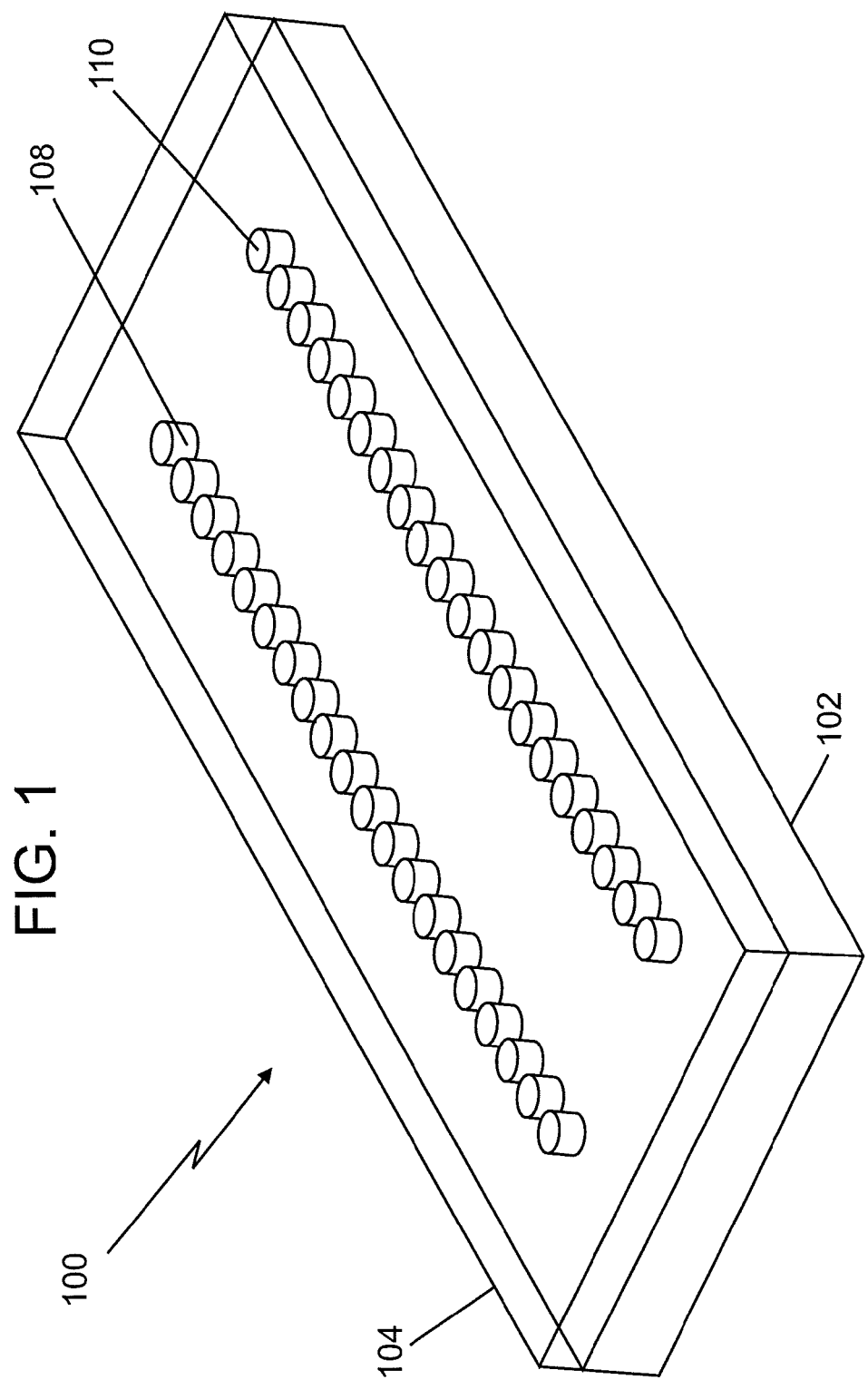
FIG. 1 is a perspective view of a waveguide in accordance with an embodiment of the invention.
Figure 2A:
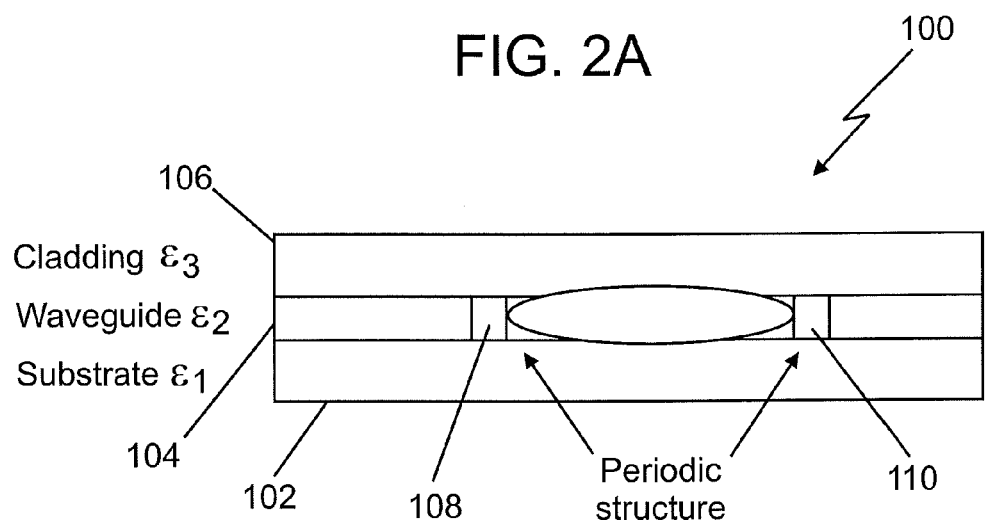
FIGS. 2A and 2B, are cross section and top views, respectively, of the waveguide of FIG. 1.

Referring to FIG. 1, there illustrated is a perspective view of a waveguide 100 in accordance with an embodiment of the invention. The waveguide 100 includes a substrate 102, a waveguide layer 104, and a cladding 106 (FIGS. 2A and 2B), which is not shown in FIG. 1 for clarity. Embedded within the waveguide layer 104 are two parallel periodic linear arrangements 108, 110 of sub-wavelength sized regions with a dielectric constant that is the same for each regions but different from that of the surrounding waveguide layer 104. The periodicity, dimensions and shape of the regions of the periodic linear arrangements 108, 110 are selected such that an electromagnetic wave incident on the waveguide structure 100 experiences relatively little transverse loss through the periodic linear arrangements 108, 110. Components of the electromagnetic wave which propagate under an angle with respect to the waveguide layer 104 experience a phase shift of 180 degrees when passing through the regions 108, 110 with a selected relatively high dielectric constant compared to space between the regions 108, 110 which is filled by the waveguide layer material 104 with a selected relatively low dielectric constant while the amount of optical flux through both the regions 108, 110 and the space between the regions 108, 110 is approximately the same. Because of destructive interference behind the periodic linear arrangements 108, 110, most of the incident wave is reflected back into the waveguide structure 100. The guiding in the direction normal to the substrate 102 is achieved by total internal reflection. Hence, the dielectric constant of both the substrate 102 and the cladding 106 have to be lower than the dielectric constant of the material that fills the waveguide layer 104, for example, with polymers or transparent oxides (e.g., $SiO_2$, $Ta_2O_5$, $Al_2O_3$) for the waveguide filling.

The appropriate shape of the regions 108, 110 is strongly dependent on the desired wavelength of operation, the dielectric constants of the involved materials and the geometry of the waveguide 100. With simulations of Maxwell's equations, e.g., using a Finite-Difference Time-Domain method, the suitable periodicity, dimensions and shape of the regions 108, 110 are tailored for the intended bandwidth and transmission. The width of the waveguide 100 is chosen such that the loss perpendicular to the substrate 102 and the transversal loss through the periodic arrangements 108, 110 are both relatively small. A relatively high contrast in the dielectric constant is important, hence, semiconductors such as Si, GaAs or InP are suitable for the regions 108, 110 with high dielectric constant and dielectric materials such as SiO2, polymers or air are suitable for the regions 108, 110 with low dielectric constant. After an initial value for all parameters (dimensions and shape of the single elements in the periodic arrangements, their periodicity and the waveguide width), the parameters are iteratively altered to achieve the highest transmission through the waveguide 100, which is calculated with e.g. finite-difference time-domain methods. Alternatively, this optimization can be done using one or a combination of several algorithms, e.g. Monte-Carlo, genetic algorithms and likewise.

Figure 2B:
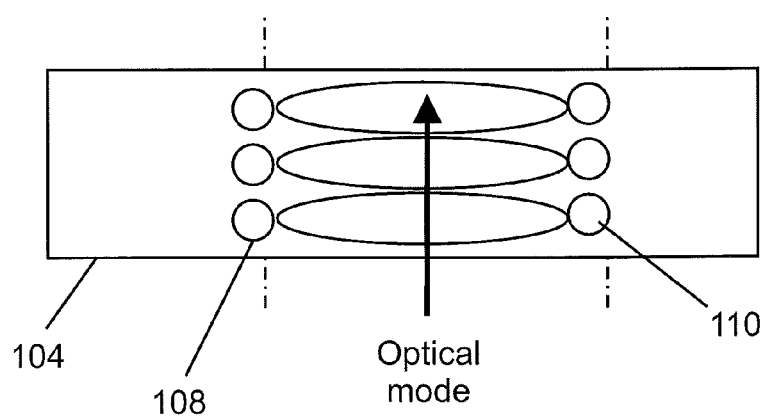

Referring also to FIGS. 2 and 3, the waveguide 100 having periodic sub-wavelength sized regions 108, 110 according to the embodiment of FIG. 1 comprises a layered stack that includes the substrate 102 with a dielectric constant of epsilon1, the waveguide layer 104 with a dielectric constant of epsilon2, the cladding 106 with a dielectric constant of epsilon3, and the two periodic linear arrangements 108, 110 of cylindrical elements or regions with a dielectric constant of epsilon4. The dielectric constants fulfill the condition: epsilon4>epsilon2>epsilon1, epsilon3. Thus, the dielectric constant of the regions 108, 110 may be the same but different from that of the substrate 102, waveguide layer 104 and the cladding 106. In addition to suitable dielectric transparent material (oxides, polymers, etc.), the cladding 106 may be made of air (epsilon3=1) or the same material as that of the substrate 102 (epsilon3=epsilon1). FIG. 2B illustrates an arrowhead that depicts the travel of the electromagnetic radiation within the waveguide 104 in a direction parallel to the periodic linear arrangements 108, 110.

In an exemplary embodiment, the relevant parameters may be epsilon1=epsilon3=2.16 (corresponding to SiO2), epsilon2=2.9 (corresponding to a polymer), and epsilon4=17.6 (corresponding to Si at a wavelength of lambda=500 nm). The height of the waveguide layer 104 and the periodic structure is 1.3*a, the periodicity is 1.0*a, and the radius of the individual cylindrical elements 108, 110 is 0.25*a. The variable "a" may be chosen to scale the structure and the resonant frequency f, for example, to use the calculated resonance at f=0.56*c/a (c=speed of light) to realize a waveguide for a vacuum wavelength of lambda=500 nm, "a" is set to a=0.56*lambda=280 nm.

Figure 3A:
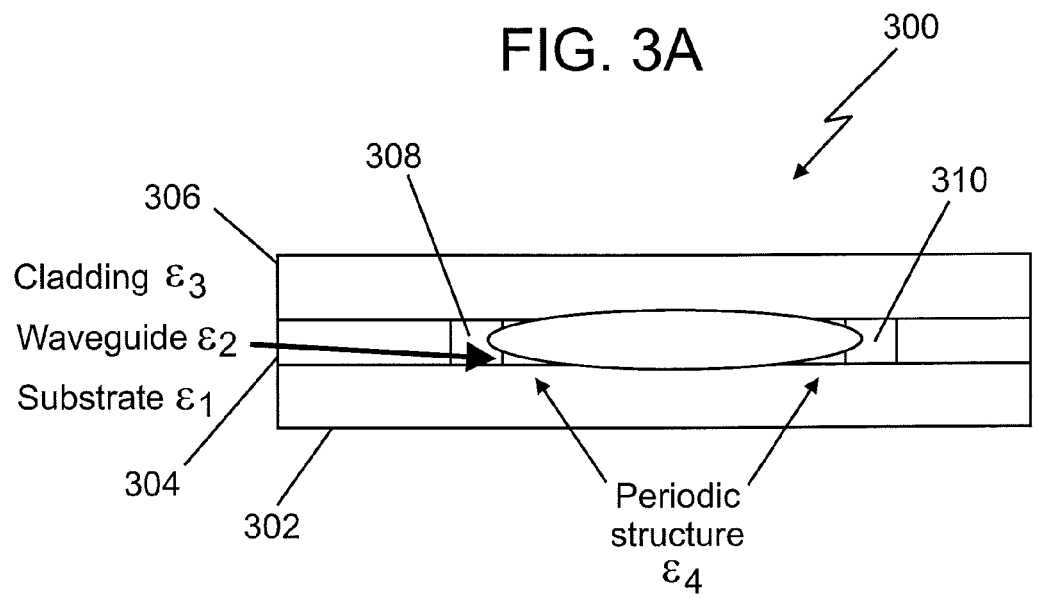
FIGS. 3A and 3B, are cross section and top views, respectively, of a waveguide in accordance with another embodiment of the invention.
Figure 3B:
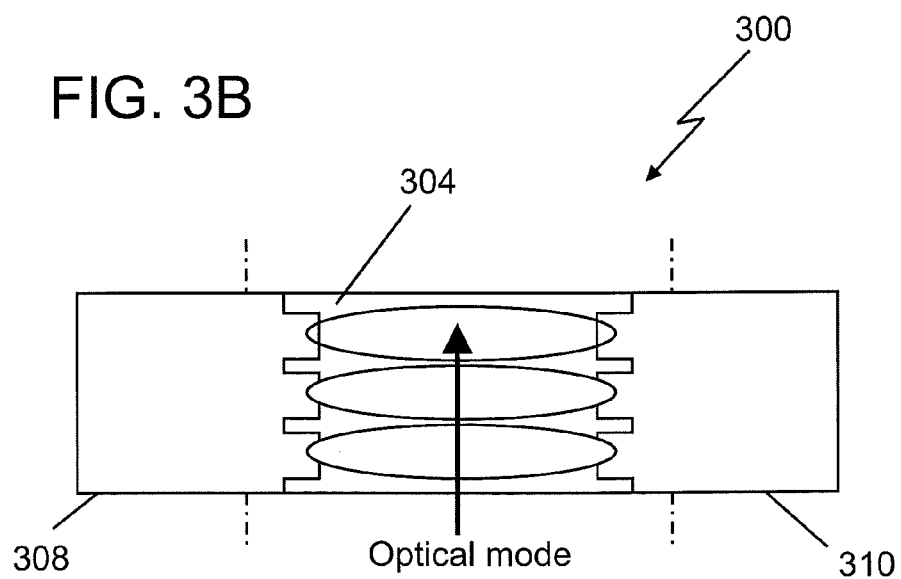

Referring to FIGS. 3A and 3B, a waveguide 300 having periodic sub-wavelength sized regions according to another embodiment comprises a layered stack made up of a substrate 302 with a dielectric constant of epsilon1, a waveguide layer 304 with a dielectric constant of epsilon2, a cladding 306 with a dielectric constant of epsilon3, and two periodic linear arrangements (structure) 308, 310 of cuboid elements with dielectric constant epsilon4 and adjacent planes with dielectric constant epsilon3. The dielectric constants of this embodiment fulfill the condition: epsilon4>epsilon2>epsilon1, epsilon3. The material for the waveguide layer 304 and the regions 308, 310 may comprise the same material (epsilon2=epsilon4). In addition to suitable dielectric transparent material (oxides, polymers, etc.), the cladding 306 may comprise air (epsilon3=1) or the same material as that of the substrate 302 (epsilon3=epsilon1). FIG. 3B illustrates an arrowhead that depicts the travel of the electromagnetic radiation within the waveguide layer 304 in a direction parallel to the periodic linear arrangements 308, 310.

Referring to FIGS. 4 and 5, there illustrated is another embodiment of a waveguide 400 in accordance with the invention that changes the propagation direction of the electromagnetic wave using two parallel periodic sub-wavelength sized curved arrangements 406, 408 of elements. Similar to the previously described embodiments, the waveguide 400 comprises a layered stack that includes a substrate 402 with a dielectric constant of epsilon1, a waveguide layer 404 with a dielectric constant of epsilon2, a cladding (not shown for clarity) with a dielectric constant of epsilon3, and the two arrangements 406, 408 of elements with a dielectric constant of epsilon4. The periodicity, shape (e.g., cylindrical, cuboid, trapezoidal), and size of the elements in the arrangements 406, 408 embedded in the waveguide layer 404 may be selected to have the highest transmission at the desired wavelength. The dielectric constants fulfill the condition: epsilon4>epsilon2>epsilon1, epsilon3. In addition to suitable dielectric transparent material (oxides, polymers, etc.), the cladding may comprise air (epsilon3=1) or the same material as the substrate 402 (epsilon3=epsilon1).

Referring to the top view of FIG. 6, the waveguide 400 according to an alternative embodiment of that in FIGS. 4-5 changes the propagation direction of the electromagnetic wave using two parallel periodic sub-wavelength sized arrangements 406, 408 of elements in a different manner from the waveguide 400 of FIGS. 4-5. Specifically, instead of the gradually curved arrangements 406, 408 of FIGS. 4-5, each of the arrangements 406, 408 of the waveguide 400 of FIG. 6 has two straight sections—one oriented horizontally in FIG. 6 and the other oriented vertically in FIG. 6. The turning of the electromagnetic wave is achieved through two angled reflective elements 410, 412 located in the upper right hand corner within the periodic arrangements 406, 408, respectively of FIG. 6. As with the elements of the two straight sections, the elements of the angled sections 410, 412 have suitable periodicity, shape and size. The optimization of this geometry through simulations of Maxwell's equations is targeted to have the highest transmission through the waveguide bend at the desired wavelength. The dielectric constants fulfill the condition: epsilon4>epsilon2>epsilon1, epsilon3. In addition to suitable dielectric transparent material (oxides, polymers etc.) the cladding can be made of air (epsilon3=1) or the same material as the substrate (epsilon3=epsilon1).

An advantage of the various embodiments of the waveguide of the invention is that the waveguide has considerably less transmission loss than prior art waveguides when the material for the guiding structure absorbs in the wavelength range to be transmitted (e.g., the visible range). This enables the use of crystalline semiconductors such as Si, GaAs or InP also in the visible wavelength range without the need of structuring the waveguide layer which may comprise polymers or transparent oxides. This facilitates the integration of chip-based silicon photonics with the polymer waveguide technology, which is compatible with printed circuit boards. Suitable fluids may also be used as the waveguide material.

Another advantage is that the light is guided in the transparent waveguide layer with a lower dielectric constant compared to the guiding elements, thereby allowing the use of a wide range of materials. The transparent layer may be easily deposited (e.g., spin coating of a polymer) and does not require further structuring. Thus, it is relatively straightforward to incorporate nonlinear or gain functionalities in the waveguide. If the guiding elements consist of a doped semiconductor, the elements may also be also used as electrodes to inject charges into the waveguide material or to apply electromagnetic fields (increased gain, electro-optical modulation etc.). The waveguide layer may also comprise a suitable fluid, and the electrodes may then be used to manipulate (e.g., charge, trap, analyze, etc.) nanoparticles that may be contained in the fluid. Still another advantage is the smaller footprint compared to photonic crystal waveguides which allows denser areal integration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An optical waveguide, comprising:
   a substrate comprising a dielectric material having a dielectric constant $\epsilon_1$;
   a waveguide layer disposed on and in contact with the substrate, the waveguide layer having a dielectric constant $\epsilon_2$;
   a plurality of sub-wavelength sized regions embedded within the waveguide layer, wherein the plurality of regions are arranged in a pair of curved parallel rows defining a space therebetween filled by a material of the waveguide layer, wherein each of the regions has a dielectric constant $\epsilon_4$, the dielectric constant $\epsilon_4$ of each of the regions is greater than the dielectric constant of the waveguide layer $\epsilon_2$, and wherein destructive interference of the electromagnetic radiation propagating within the waveguide layer with the plurality of sub-wavelength sized regions allows the electromagnetic radiation to change a propagation direction in the optical waveguide along a curved path defined by the curved parallel rows; and
   a cladding layer disposed over and in contact with the plurality of sub-length sized regions and the waveguide layer, the cladding layer having a dielectric constant $\epsilon_3$ that is less than the dielectric constant $\epsilon_4$ of each of the regions of the plurality of sub-wavelength sized regions and the dielectric constant $\epsilon_2$ of the waveguide layer.

2. The optical waveguide of claim 1, wherein the substrate comprises an oxide material.

3. The optical waveguide of claim 1, wherein the substrate comprises $SiO_2$.

4. The optical waveguide of claim 1, wherein the waveguide layer comprises a polymer material.

5. The optical waveguide of claim 1, wherein the cladding layer comprises air.

6. The optical waveguide of claim 1, wherein the cladding layer comprises an oxide material.

7. The optical waveguide of claim 1, wherein the cladding layer comprises $SiO_2$.

8. The optical waveguide of claim 1, wherein the dielectric constant $\epsilon_1$ is less than the dielectric constant $\epsilon_4$ and the dielectric constant $\epsilon_2$.

9. The optical waveguide of claim 1, wherein the each of the of sub-wavelength sized regions of the plurality of sub-wavelength sized regions embedded within the waveguide layer comprise a semiconductor material.

10. The optical waveguide of claim 1, wherein the each of the of sub-wavelength sized regions of the plurality of sub-wavelength sized regions embedded within the waveguide layer comprise a silicon.

11. The optical waveguide of claim 1, wherein the parallel rows of regions are angled with respect to an original propagation direction of the electromagnetic radiation and a final propagation direction of the electromagnetic radiation.

12. An optical waveguide, comprising:
    a substrate comprising an oxide material having a dielectric constant $\epsilon_1$;
    a waveguide layer comprising a polymer material disposed on and in contact with the substrate, the waveguide layer having a dielectric constant $\epsilon_2$;
    a plurality of sub-wavelength sized regions comprising a semiconductor material embedded within the waveguide layer, wherein the plurality of regions are arranged in a pair of curved parallel rows defining a space therebetween filled with the polymer material, wherein each of the regions has a dielectric constant $\epsilon_4$, the dielectric constant $\epsilon_4$ of each of the regions is greater than the dielectric constant of the waveguide layer $\epsilon_2$, and wherein electromagnetic radiation propagating within the waveguide layer uses the curved parallel rows of regions to change a propagation direction of the electromagnetic radiation in the optical waveguide along a curved path defined by the curved parallel rows; and
    a cladding layer disposed over and in contact with the plurality of sub-length sized regions and the waveguide layer, the cladding layer having a dielectric constant $\epsilon_3$ that is less than the dielectric constant $\epsilon_4$ of each of the regions of the plurality of sub-wavelength sized regions and the dielectric constant $\epsilon_2$ of the waveguide layer.

13. The optical waveguide of claim 12, wherein the oxide material of the substrate comprises $SiO_2$.

14. The optical waveguide of claim 12, wherein the cladding layer comprises air.

15. The optical waveguide of claim 12, wherein the cladding layer comprises an oxide material.

16. The optical waveguide of claim 12, wherein the cladding layer comprises $SiO_2$.

17. The optical waveguide of claim 12, wherein the semiconductor material of each of the of sub-wavelength sized regions of the plurality of sub-wavelength sized regions embedded within the waveguide layer comprise a silicon.

18. The optical waveguide of claim 12, wherein the dielectric constant $\in_1$ is less than the dielectric constant $\in_4$ and the dielectric constant $\in_2$.

* * * * *